United States Patent [19]
Kindl et al.

[11] 3,826,998
[45] July 30, 1974

[54] GAS LASER

[75] Inventors: Helmut Kindl, Muenchen; Heinz Westermeier, Neubiberg, both of Germany

[73] Assignee: Siemens Aktiengesellschaft, Berlin and Munich, Germany

[22] Filed: June 6, 1973

[21] Appl. No.: 367,413

Related U.S. Application Data
[63] Continuation of Ser. No. 113,454, Feb. 8, 1971, abandoned.

[30] Foreign Application Priority Data
Feb. 20, 1970   Germany.............................. 2007939

[52] U.S. Cl. ........................ 331/94.5 C, 331/94.5 D
[51] Int. Cl. ............................................. H01s 3/00
[58] Field of Search .................... 331/94.5 C, 94.5 D

[56] References Cited
UNITED STATES PATENTS

| | | | |
|---|---|---|---|
| 3,428,915 | 2/1969 | Leone et al. ......................... | 331/94.5 |
| 3,478,279 | 11/1969 | Kobayashi et al. ................. | 331/94.5 |
| 3,496,488 | 2/1970 | Fork et al. ......................... | 331/94.5 |
| 3,503,004 | 3/1970 | Haisma et al. ..................... | 331/94.5 |
| 3,568,089 | 3/1971 | Tanaka .............................. | 331/94.5 |

Primary Examiner—Edward S. Bauer
Attorney, Agent, or Firm—Hill, Gross, Simpson, Van Santen, Steadman, Chiara & Simpson

[57] ABSTRACT

Gas laser assembly including an elongated tube having a mirror mount closing one end of the tube wherein a fitting on the tube end has a circumferentially weakened wall section and wherein the mirror is mounted on the fitting on the opposite side of the weakened wall section from the tube itself so that external application of pressure on the mirror mount will deform the weakened wall section to a sufficient degree to permit accurate adjustment of the mirror relative to the axis of the tube. The fitting preferably includes a closing window serving as a mounting for the mirror and secured to the fitting so that the adjustment of mirror angle can be effected externally of the device itself without permitting gas escape. The weakened wall section is in the form of a circumferential recess formed in the metal fitting or in the form of a circumferential stiffening corrugation.

3 Claims, 2 Drawing Figures

PATENTED JUL 30 1974  3,826,998

INVENTORS
*Helmut Kindl*
*Heinz Westermeier*

BY *Hill, Sherman, Meroni, Gross & Simpson* ATTYS.

GAS LASER

This is a continuation of application Ser. No. 113,454, filed Feb. 8, 1971, and now abandoned.

FIELD OF THE INVENTION

The invention is directed to an improved means for varying the angle of a mirror at one end of a gas laser tube in order to permit fine adjustment of the mirror angle relative to the axis of the tube.

PRIOR ART

Gas lasers have heretofore been designed which have had highly reflecting parallel mirrors fitted in metal chambers and positioned at either end of elongated quartz tubes in order to reflect stimulated light back into the cavity of the tube. Various means have been devised to permit external adjustment of the angle of the reflective mirrors relative to the axis of the tube. Initially, the mirrors were taken outside the evacuated tube and placed within separate housings which were secured to each end of the tube. The mirror shapes were subsequently changed from flat to concave with a radius of curvature depending upon the spacing between the mirrors.

The problem of facilitating mirror adjustment and at the same time providing a mirror assembly which is integrated with the laser tube is particularly difficult to overcome. It is of course only possible to effect mirror adjustment while the laser is in operation if the discharge path is closed off so that the laser gas mixture cannot escape to the atmosphere during the adjusting process.

It has previously been proposed to provide a tubular device externally of a laser tube closed by a window which tube is provided with circumferential slots and is adapted to carry a mirror and has a screw means connected to one corner of the mirror mount to provide a means for permitting mirror adjustment.

Lasers have further been provided with a mirror mount formed within a fitting connected to one open end of the laser tube with the mirror mount being hinged on one side and having a screw type device associated with the other in order to permit adjustment of the mirror. A flexible bellows is interposed between the relatively movable sections of the mirror mount to permit the desired adjustment.

SUMMARY OF THE INVENTION

The present invention obviates many of the disadvantages of the relatively more complex means heretofore devised for effecting mirror adjustment in a laser and at the same time provides an arrangement wherein a mirror mount without separate movable parts can be made integral with the tube of the laser itself.

The mirror mount fitting includes a metal member having a weakened wall corrugation formed circumferentially therearound with a window closing the outer end of the fitting. The inner end of the fitting is made integral with the end of the laser tube and the reflecting mirror is formed on the closing window itself. The corrugation or single bellows type formation on the fitting may extend inwardly or outwardly of the tube axis but in either event is substantially weaker and of substantially lesser thickness than the remainder of the fitting wall. As a consequence, the operator can actually deform the fitting at the corrugation or weakened wall to a sufficient extent to adjust the mirror to a desired position relative to the tube axis.

There is of course no free play since the whole device consists only of a single part and once the fitting is deformed to the extent necessary to provide accurate mirror alignment, no further maladjustment should result.

It is therefore an important object of the invention to provide a mirror mount for a gas laser tube wherein mirror adjustment can be effected by deformation of the mount itself without opening the laser tube to the atmosphere.

A more specific object of the invention resides in the provision of such a mirror mount wherein the mirror is affixed to a window seated on one end of a metal fitting which fitting is secured to the laser tube and has a weakened wall portion formed circumferentially thereabout intermediate the mirror mount and the tube to permit deformation at that point.

These and other features and advantages of the invention will become apparent from time to time as the following specification proceeds and with reference to the accompanying drawings.

DETAILED DESCRIPTION OF THE PREFERRED EMBODIMENTS

Figure 1:
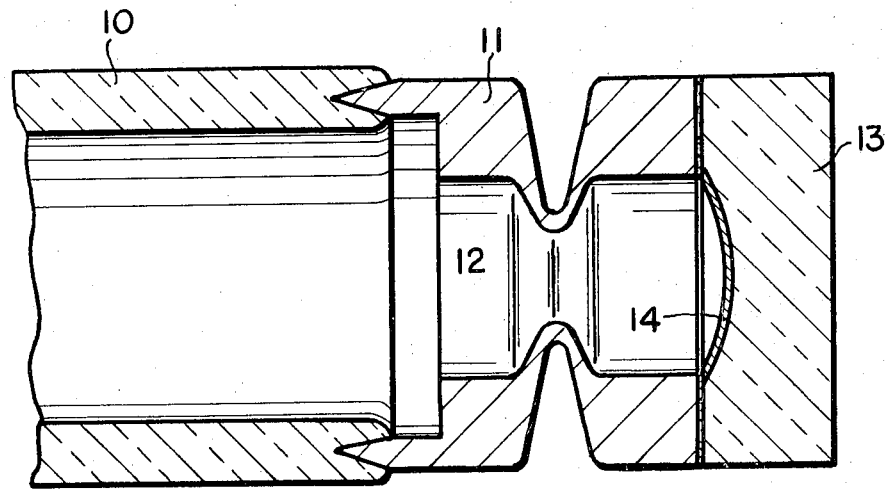
FIG. 1 is a fragmentary vertical sectional view of one end of a laser tube showing a deformable mirror mount fitting fitted thereon with an inturned weakened wall corrugation.

FIG. 1 illustrates one end of a gas laser tube. The quartz tube 10 has a metal mirror mount or fitting 11 connected thereto which is cylindrical in configuration and this mirror mount may serve simultaneously as the tube electrode and as the mirror mount. The fitting 11 has an inturned convolution 12 which is thinned out substantially at the point of the convolution to provide a weakened wall which can be deformed. A glass block 13 is glued or otherwise securely fitted to the metal fitting 11 and has a concave mirror surface 14 formed thereon and facing into the tube 10. Since the tube 10, fitting 11 and block 13 are integral with one another, there is no possibility for gas escape from the interior of the tube and because the circumferential inturned convolution is defined by a portion of the fitting of decreased wall strength as compared with the remaining portion of the fitting, adjustment of the angle of the mirror relative to the axis of the tube 10 can be effected from outside the device by applying a tool such as a screw driver to the stiffening corrugation for plastically deforming the corrugation. The outer end of the fitting 11 with the associated block and mirror can thereby be tilted with respect to the inner section in order to adjust the mirror exactly to the capillary tube axis and thus adjust it perfectly with respect to the mirror at the opposite end of the tube. This arrangement has the additional advantage that the stiffening corrugation which is directed to the inside is simultaneously dimensioned in such a way that it also functions as an aperture to limit the number of oscillating modes integrated mode screen.

Figure 2:
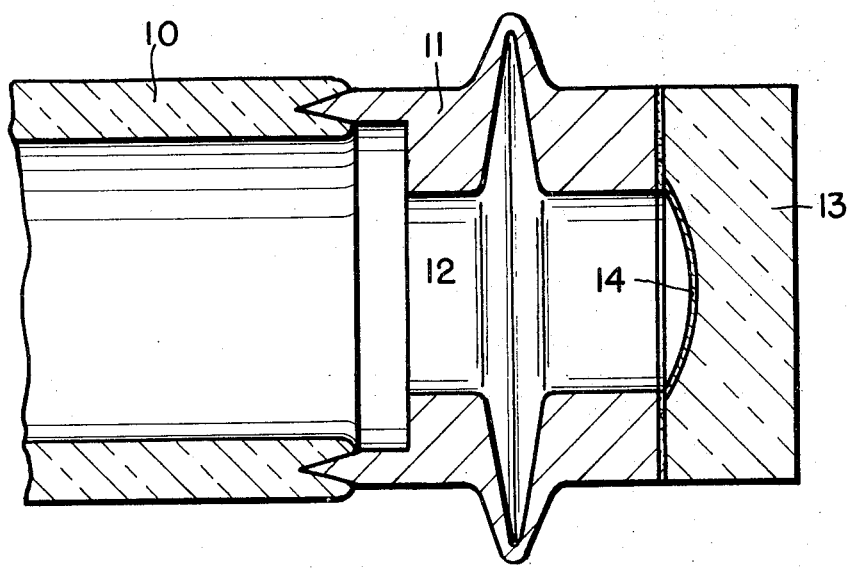
FIG. 2 is a fragmentary vertical sectional view similar in nature to FIG. 1 by showing a different embodiment of the invention wherein the weakened wall section of the mirror mount fitting is in the form of an outturned deformable stiffening corrugation.

In some lasers (particularly those which employ tubes of very small diameter), it may be desirable to effect the same end by providing the metal fitting with a weakened wall stiffening corrugation formed circumferentially about the fitting but directed outside of the fitting. Such a fitting is illustrated in FIG. 2. (Note: Those parts illustrated in FIG. 2 which have like counterparts in FIG. 1 bear the same numbers as in FIG. 1. The outturned circumferential corrugation will permit the same type of adjustment of mirror angle relative to the capillary tube axis and such mirror tilting can preferably be effected by squeezing the stiffening corrugation at the required points with the help of pliers.

Other modifications may of course be made without departing from the spirit of the invention. For instance, the closing windows of the laser tube mounted on the outer end of the fitting may be separated from the mirrors themselves and hence through the means of this invention adjusted exactly to the Brewster angle.

What we claim is:

1. A method of adjusting the orientation of a fitting mounted on a gas laser tube, said fitting at said zone being mounted on said tube and having a plastically deformable zone formed by a circumferential weakened wall section, said section being weakened only about a single circumferential line, and a tube closing element mounted on said fitting, said tube closing element and said tube being integral with one another to prevent gas escape from within said tube, said method comprising manually applying a tool to said fitting at said zone for permanently plastically deforming said fitting, whereby said orientation is changed when said tool is removed.

2. The method according to claim 1, wherein said weakened wall section is concave outward, and including the step of deforming said fitting by applying a screw driver to said concave portion.

3. The method according to claim 1, wherein said weakened wall section is convex outward, and including the step of deforming said fitting by applying a pair of pliers to said convex portion.

* * * * *